(12) United States Patent
Jarvi et al.

(10) Patent No.: US 6,553,107 B2
(45) Date of Patent: *Apr. 22, 2003

(54) EXTRACTION OF DESIRED DATA FROM FLOW

(75) Inventors: Jukka Jarvi, Puuppola (FI); Kimmo Poikolainen, Aanekoski (FI)

(73) Assignee: Nokia Corporation, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,888

(22) Filed: Sep. 23, 1999

(65) Prior Publication Data

US 2002/0034285 A1 Mar. 21, 2002

Related U.S. Application Data

(63) Continuation of application No. PCT/FI98/00289, filed on Apr. 1, 1998.

(30) Foreign Application Priority Data

Apr. 16, 1997 (FI) ................................................. 971621

(51) Int. Cl.$^7$ ............................................. H04M 15/00
(52) U.S. Cl. ................... 379/114.03; 379/126; 379/133
(58) Field of Search ........................ 379/114, 111–116, 379/119, 121, 126, 133, 144; 709/203; 707/102

(56) References Cited

U.S. PATENT DOCUMENTS 4,979,207 A    12/1990   Baum et al.
5,495,567 A  *  2/1996   Iizawa et al.
5,671,408 A  *  9/1997   McBride
5,848,141 A  * 12/1998   Beck et al.
5,907,603 A  *  5/1999   Gallagher et al.
5,913,029 A  *  6/1999   Shostak

FOREIGN PATENT DOCUMENTS

WO    WO 93/08661    4/1993
WO    WO 95/24094    9/1995

* cited by examiner

Primary Examiner—Duc Nguyen
Assistant Examiner—Barry W Taylor
(74) Attorney, Agent, or Firm—Squire, Sanders & Dempsey L.L.P.

(57) ABSTRACT

In known telephone systems it is very difficult to change call detailed records CDR formatted from a raw data flow. In the proposed method, the exchange supplier formats a special mother form, which is a file and which shows in plain language (in ASCII form) all names and parameters of fields in the raw data flow. The operator has a program using a graphic interface and showing the mother form in the display. Beside it a user form blank is seen and the user selects the fields he desires simply by dragging with the mouse the field of his choice from the mother form into the user form and by dropping the field here (drag and drop). In this manner the user formats his own form, which contains such data only which he wishes to have in the CDR. When the user form has arrived at the telephone exchange and at the billing center, it can be activated at any time. The formatting process hereby extracts from the raw data flow the data corresponding to fields stated in the form, thus formatting the CDR and sends it to the billing center, which using the same form made by the user will interpret the data contained in the received CDR, that is, it creates fields and attaches data belonging to fields from the CDR. Thus, the names of fields are not transferred from the exchange to the billing center.

16 Claims, 7 Drawing Sheets

Mother -Form: 4543000M.000

| Format Number | Output mode | Output device |
|---|---|---|
| 003000 | BIN | DISK |

| Header field name | Type | Length | | |
|---|---|---|---|---|
| hea_record_length | W | 2 | | |
| hea_format_number | W | 2 | | |
| hea_exchange_id | B | 10 | | |
| hea_saving_time | B | 8 | | |

...

| Data field Name | Type | Length | Position | Format |
|---|---|---|---|---|
| storage_code | W | 2 | 0 | |
| establishment_code | DW | 4 | 2 | |
| call_identifier | DW | 4 | 6 | |
| ... | | | | |
| a_subscriber | B | 16 | 26 | BCD 1 |
| b_subscriber | B | 16 | 43 | BCD 1 |
| start_time_of_call | B | 8 | 145 | DM 2 |
| end_time_of_call | B | 8 | 153 | DM 2 |
| clear_code | DW | 4 | 166 | |

Customer-Form: 4543003P.001

| Format Number | Output mode | Output device |
|---|---|---|
| 003001 | BIN | DISK |

| Header field name | Type | Length |
|---|---|---|
| hea_record_length | W | 2 |
| hea_format_number | W | 2 |
| hea_exchange_id | B | 10 |
| hea_saving_time | B | 8 |

| Data field Name | Type | Lenght | Position | Format |
|---|---|---|---|---|
| a_subscriber | B | 16 | 26 | BCD 1 |
| start_time_of_call | B | 8 | 145 | DM 2 |
| end_time_of_call | B | 8 | 153 | DM 2 |

Fig. 5

EXTRACTION OF DESIRED DATA FROM FLOW

This is a continuation of PCT/FI98/00289 filed April 1998.

FIELD OF THE INVENTION

This invention concerns extraction of desired data from a structured data flow, especially extraction of predetermined data from a continuous flow of Call Detail Records produced by a telephone exchange.

BACKGROUND OF THE INVENTION

Billing in consequence of services is implementation of the agreement between the service producer and his customer. In principle, there are two kinds of billing: decentralised and centralised billing.

In decentralised billing, the customer pays to the seller for each time of using services provided by the seller. The payment is performed either with conventional money or with some equivalent means of payment, e.g. postage stamps are used when paying for delivery of letters. A more recent example of a means of payment used in decentralised billing is electronic money where each "coin" consists of a an encrypted binary sequence, which must be verified by a bank server.

In centralised billing, the use of services is monitored by the seller or by a third party. The customer is billed periodically, e.g. once a month. The bill is based on monitoring data collected for the preceding billing period. Examples of centralised billing are electricity, telephone and credit card billing. Centralised billing consists of three steps. The first step is an agreement between the parties on services and on related billing. The second step is monitoring (or measurement) of the use of services and saving of data concerning the use. The third step is formatting of the bill and sending the same to the customer. The bill is formed according to data saved in the billing system.

The centralised billing used in a telephone network is based on an agreement between subscribers and operator. The essential point of the agreement is that the subscriber gets access to telephone services, that is, he may make and receive calls, and as a compensation for the service provided he performs payments according to predetermined tariffs, as specified in bills sent to him by the operator. The bills typically include charging of two types: fixed charges and use charges. The fixed charges are independent of whether services are used or not. Use charges depend on how many calls the subscriber has made and possibly also on how many calls he has received. To be able to debit for use charges the operator must monitor made and received calls. Such monitoring is connection-based and it is performed by network switches.

FIG. 1 illustrates a known centralised billing method used in a telephone network by presenting a part of a public telephone network. For each call which is made the local exchange LE (the subscriber's Local Exchange) performs a call detailed data collection and formats a CDR (Call Detail Record). The record contains all the information required in billing for one call as well as any desired quantity of other information related to the call. Call detailed data collection is always used when specified detailed information on a call is required for billing or for monitoring of call details. The structure of the Call Detail Record is determined by a an operation control command before the call detailed data collection is introduced. The record structure must be determined as a uniform structure in all exchange elements controlled by the network management. Hereinafter the Call Detail Records will also be called by the name of CDR and the program formatting the Call Detail Records will be called the CDR generator. Formatted CDRs are sent to the BS (Billing Centre) for post processing.

Formatting of the Call Detail Record requires that the operator establish some basis for formatting of the Call Detail Record. Formatting may be based e.g. on call detailed data collection of all the calls of the subscriber or formatting may be based on the call type, that is, whether the call in question is a normal call, a facility call, such as call transfer etc., a call free of charge, , an IN call (intelligent network call) etc. In fixed network applications there are about 30 different formatting bases. The formatted Call Detail Records are first saved in the memory and are then sent to the centralised billing system, where they are saved in mass storage, e.g. on magnetic tape or on a hard disk.

Between the exchange and the billing system there may also be an additional processing step, wherein call detailed data collection records are "pre-processed" for the billing system. Such pre-processing may be formatting, where e.g. a tariff class field is converted from one format into another. Whether there is pre-processing or not, call detailed data collection will produce enormous data blocks containing even millions of records, and these may be saved in the billing system's mass storage. The records form the raw information which the billing system begins to process.

Thus, processing of call detailed data collection records takes place at a later moment as batch processing which is separate from the generation of call detailed data collection records. It should be noted that in practice billing may be even much more complicated than the example described above. E.g. in a mobile station network, each mobile services switching centre taking part in the call may generate call detailed data collection records. However, the billing principle is as described in the foregoing.

Processing of a CDR format in present fixed network telephone systems is described in the following referring to FIG. 2. The figure shows functions of the telephone exchange which are essential from the viewpoint of the invention.

The call detailed data collection process obtains information related to the call as raw data in individual messages mainly from the call control. The call detailed data collection process saves the information in a record reserved for the call. On termination of the call or in connection with interim data collection, the data collection process sends the call record as a whole in messages of various types to the process for saving of Call Detail Records. The message has a call type number indicating the nature of its contents and a message sequence number. The structure of successive messages is always the same and the type will determine which fields in the message must be filled in. If the number of fields to be filled in is less than the number of fields in the message, then void fields are filled in with a filling code. The messages are thus always sent in their entirety.

The saving process goes to read the message structure in a separate format file and starts formatting of the record from a raw data flow which it receives. The structure of the call record and of the format file is fixedly structured in the code of the process for storing the call detailed data collection. Fixed coding is done, because the place of the field in the call record is not found out from the format file. The process for saving the call detailed data collection reads the formatting file successively and from the received call record it picks up a field for locating it in the CDR, if in the formatting file the said field is defined as one to be taken along. The manner in which the individual field is coded in the CDR is also fixedly established in the code of the process for saving the call detailed data collection.

If it is desired in some application to have a different processing for some field in a message, e.g. a time field format, then this must be done through control of the application switch.

When the process for saving the call detailed data collection has completed the CDR, it locates it in the RAM block. Normally, one block can accommodate 5–10 CDRs. When the block is completed, it is saved on the hard disk of the concerned telephone exchange or it is sent outside the exchange to some I/O equipment, e.g. to the hard disk of the operation control centre. It is also possible to send received blocks directly to the post processing process.

It is possible for the operator to output e.g. CDRs formatted of some subscriber's calls from a block saved on the hard disk of the operation control centre. This is done with a Man Machine Language (MML) command. The command starts a read program, wherein the structure of the format file of call detailed data collection and the names of fields corresponding to its sub-files are fixedly coded. Reading is performed from the ring buffer of the hard disk.

Formats saved in the formatting file will also be briefly described. The operator brings about the format he desires with an MML command. The command will first output for the operator in plain language in the monitor display all fields.l. sub-files available in the message. Thereupon the operator selects those fields which he wishes to locate in the format to be made. From the available fields the operator may take a field or remove a field, but he can not change the order of fields. When the user has made his choice, the format is completed and it may be output to the display or printed out on paper. The output will indicate in plain language which fields are present in the format.

The format may be e.g. in the form
Call Subscriber Number
whereby the name of the field is call subscriber number and the numerical value 10 expresses the place of the field combination in the CDR.

The MVIML function reads the fields (sub-files) available in the format file of the call detailed data collection process and uses the same both in the MML command, with which the user creates the format he desires, and in the MML command, with which the format chosen by the user is output onto the display or on paper. It is shown by the format file which fields can be chosen and whether the chosen field is present in the Call Detail Record CDR. The format file contains as many sub-files as the maximum number of fields in the Call Detail Record CDR.

The structure of the format file's sub-file is of the type:

| FIELD_IN_RECORD | POSITION |
|---|---|
| TRUE | 0 |

As can be seen from the shown type, it does not indicate the field name in plain language. For this reason, the names of fields in plain language as well as their correspondence in the format file are fixedly coded in the MML function. Coding is e.g. as follows:
IF CRPARA.SUB_REC(1).FIELD_IN_RECORD= TRUE THENDO:
CALL MOVB("CALL TIME",MML_ FORMAT.RECORD_HEADER . . .

This means that if a field located in position 0 from a format file by the name of CRPARA, which field is here called FIELD_IN_RECORD, is true, that is, the user chose it when making the format, then it is given the name CALL TIME in plain language.

There are some drawbacks in the state-of-the-art formatting of Call Detail Records described in the foregoing.

Firstly, when Call Detail Records are sent from a telephone exchange to a billing centre performing post processing, the data flow to be sent is a big one. Above all, it contains plenty of void or unmarked fields. When the raw data flow contains data in binary form, in hexadecimal form and in ASCII form, then the formatted CDRs will also contain data which is in different forms. Data in different forms will add to the quantity of data to be transmitted from the exchange.

Secondly, if the billing centre wants CDRs of other kinds, that is, to add new fields or to remove fields presently in use, it is not only difficult but also risky to make any changes, since it must unconditionally be ensured that any changes made in the formatting file are made correctly and that the receiving end of the post processing site, that is, the billing centre, is able correctly to interpret the changed CDR data flow. In addition, some data is also usually lost when the format is changed.

Thirdly, since in the state-of-the-art arrangement the incoming data flow in all functions related to the format or field names and their correspondence in the format file are fixedly coded in the program blocks, necessary changes must always be made in the call detailed data collection saving process, in the data collection process, in the MML program and in programs related to output of CDRs when an entirely new data element is desired in the format. Besides changes in programs, the formatting file structure must also be changed and a change must be made in the conversion program of this file. The second and third items are so troublesome that the exchange supplier must know which format the buyer desires even a year before the exchange is delivered to the buyer. Thus, it is both difficult and expensive to change the format once it is made.

The present invention aims at a method not suffering from the mentioned drawbacks in use. The objective is thus a method where changing of the format is more dynamic and more reliable than in any known method. It ought to be possible to change the format "on the move" and post processing must be prepared at once to process any changed CDRs. It should be possible to create different CDRs for various purposes and thus also to bring about CDRs which are shorter than present CDRs.

The established objectives are achieved with the method and system described in the independent claims.

BRIEF SUMMARY OF THE INVENTION

The invention is based on the idea to use a special form for extracting desired data from a raw data flow. The number of forms may be high, however, so that there may be only one active form for each type of message. Each form defines exactly that information, which should be extracted from the raw data flow in order to format a CDR. When a form is activated, the formatting process will extract the data determined by the form from the data flow.

To this end, the exchange supplier formats a special mother form showing in plain language (in ASCII form) all the names and parameters of fields arriving as a raw data flow. Thus, the mother form is a file containing the message structure. Each different message has its own mother form. The mother forms are delivered to the user e.g. on a diskette.

The user has a program using a graphic user interface which shows the desired mother form in the display. Beside this a user form blank can be seen and the user chooses the fields he desires simply by using the mouse to drag the field of his choice from the mother form to the user form where he drops the field he has chosen (drag and drop). In this manner the user makes his own form, which contains only the data he wants to include in the CDR. If the user so desires, he may also determine the form in which he likes the data to be. It is possible that the user wishes all data to be in binary form. The user delivers his form e.g. on a diskette to the exchange and to the billing centre.

On arrival of the user form at the telephone exchange, it can be activated at any time. When the form is active, the formatting process will use this form in the manner of a filter and extracts from the raw data flow the data corresponding to the fields indicated on the form, thus formatting the CDR. When the CDR is completed, the exchange will send it to the billing centre, which using the same form made by the user will interpret the data contained in the received CDR, that is, it creates fields and attaches the data belonging to the fields from the CDR. The names of fields are thus not transferred from the exchange to the billing centre.

Before activation of the user form, it is possible to test the form. Hereby in the exchange the formatting process makes the CDRs defined in the form and sends them to the billing centre. This for its part will find that the CDRs are test CDRs and will handle them accordingly. Only after testing has shown that the user form works correctly both in the exchange and in the billing centre, it may be put into active use.

BRIEF DESCRIPTION OF THE DRAWINGS

The invention will be described more closely in the following with the aid of the attached diagrammatic drawings, in which FIG. 4 shows a mother form, FIG. 5 shows a user form.

DETAILED DESCRIPTION OF THE INVENTION

Figure 3:
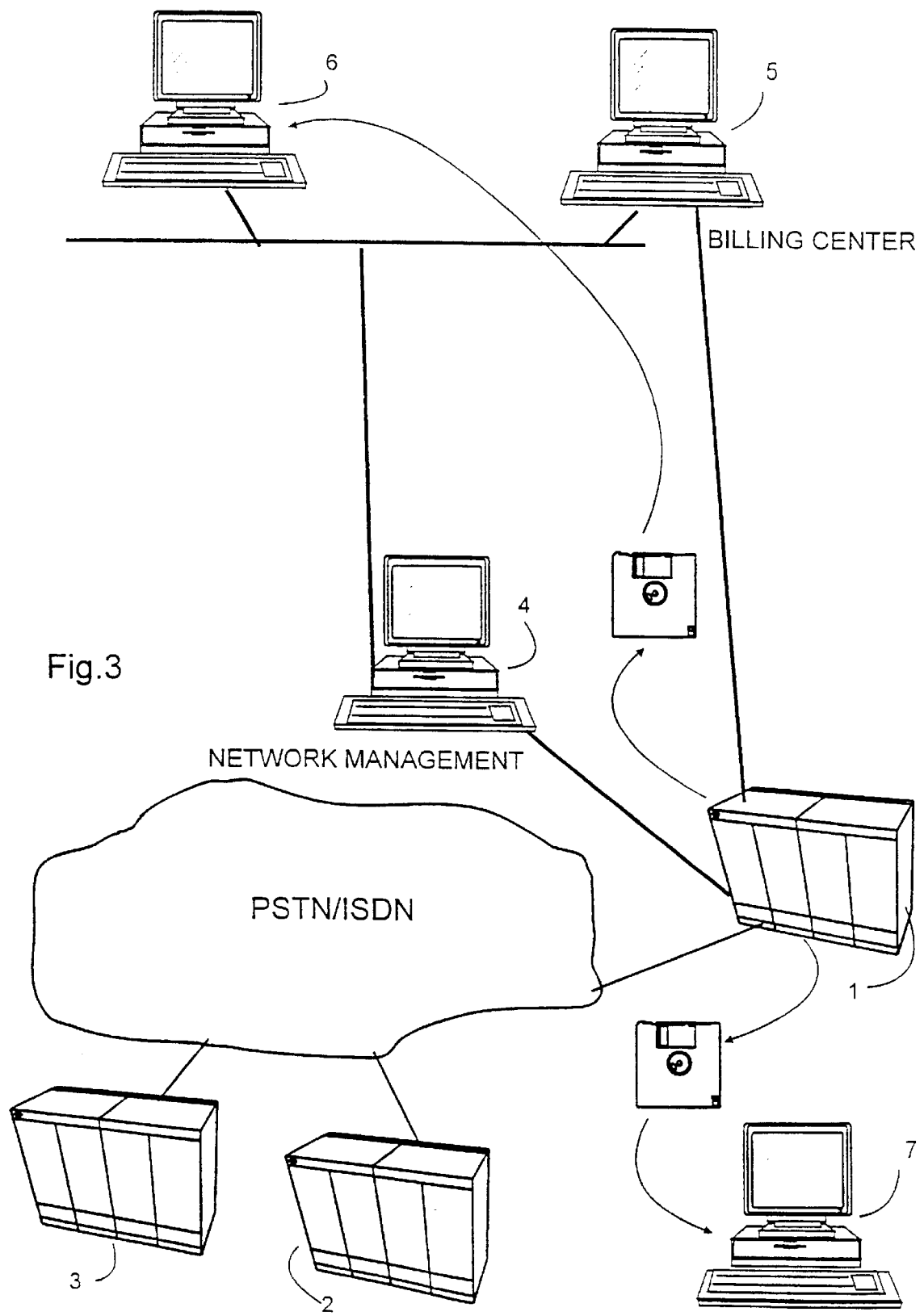
FIG. 3 shows network elements taking part in implementation of the invention

FIG. 3 shows a telecommunication network which may be a PSTN or an ISDN network and which comprises several telephone exchanges 1,2, . . . , N, each one of which formats a subscriber record CDR relating to a call made by a subscriber through an exchange. The Network Management System NMS indicated by reference number 4 attends to network management by controlling various exchanges. The billing centre BC indicated by reference number 5 receives Call Detail Records CDR arriving from different exchanges, it processes them and forms bills to be sent to subscribers. If there is no separate network management, then control and configuration of the exchange may be performed in the exchange proper instead of using remote operation. Reference number 6 indicates a general purpose computer, which contains a program with which the operator/user uses a mother form for making a user form according to the invention. The supplier of the telephone exchange for his part makes the mother form in a manner explained hereinafter.

The exchange supplier naturally has exact information about the contents of the raw data flow arriving in the message. The message structure is always the same, that is, the fields of the message and their parameters (location, length, type etc.) are constant. The message type determines which fields will be filled in when forming the message. The message is always sent in its entirety, so any fields left void must be filled with filling code. Thus, the type of message may change, although the message number remains the same. The message number and the type of data block arrive in the data flow. Table 1 below illustrates the contents of a message.

TABLE 1

```
signal charging_msg_s =
(
    seq_number          byte;
    order_number        dword;
    call_record_ind     record_number_t;
    in_cgr_name         cgr_name_t;
    out_cgr_name        cgr_name_t;
    call_record         call_record_t;
    service_record      svcfil_t;
);
```

The message is a "signal charging message" and its number is 0×4543. The data flow of the message is successive fields of different lengths, e.g. the first field in position 0 is seq_number and its length is one byte, the next field in position 2 is order_number and its length is n word. In reality, there are no field names in the message, but the message consists of field bits, which are after one another without break and without any separator marks. However, the location of each field is determined unambiguously when field positions and lengths are known. Thus, e.g. the beginning of the third field's call_record_ind (position 3) is found out, by jumping from the beginning of the message by the number of bits of the two preceding fields of messages, that is, forward by one word and one byte. From this point forward there are as many bits of the third field in the flow as is indicated by the length of the field.

Since the exchange supplier always has a tool, that is, a program, with which the message structure can be opened as position and field data, it is simple to use this program and a suitable windows© program for making the mother form. The Windows program is used for making a form having a form header and CDR headers of the desired form. The headers are in plain language. Placed under the headers are field names and field data such as the toolkit has opened them from the message. All fields are contained in the mother form. However, the order of fields need not be the same as in the message data flow. The toolkit functions as a link between message fields and the contents of fields in the data flow.

FIG. 4 shows the form of a mother form. The file name seen in the top part of the form contains mother form data: the first digits of the series of numbers, here 4543, give the message number to which the form is related, the next three digits 000 indicate the type of message. The letter M indicates that the form is a mother form. The three digits after full stop indicate the version in succession of the mother form: if the message is changed, the mother form will of course also be changed, whereby it will have a new version number. This data contained in the file name is not part of the form proper, but it is brought into the display by the windows© program.

The form header on the following line contains the fields Format Number, which indicates the message number and type, Output Mode, which here is BIN and indicates the mode of the CDR produced with the form, and Output device, which indicates where the CDRs to be formatted are saved. The place of storage may be e.g. VDS, that is, Virtual Disk System or VIDAST, where some hundred CDRs are collected on the disk and are then sent as a cluster to the billing centre. Output device may also determine that the CDR be sent immediately after formatting to the Hot Billing System.

Then comes data relating to the header line of the CDR to be formatted on the mother form. The data relates to CDR headers and is grouped under the Header field name, Type and Length of the headers. Thus all header fields and their data existing in the message and uncovered with the toolkit will come under Header field name. In the examples, the record length, hea_record_length, is first as record type W (Word) and length 2 words.

After these comes data relating to data fields of CDRs of the message proper. This is grouped under headers Data field Name, Type, Length, Position and Format. All data fields and their data existing in the message and uncovered with the toolkit come under the headers. The form shows e.g. subscriber A's field, the data type, length, position ($26^{th}$ byte in the message) and format (BCD coded). In the Format column of the form the character of the field is indicated: BCD means Binary Coded Decimal, DM is datum. The numbers located after these are instructions for the formatting program. E.g. number 1 might mean convert the binary coded data into BCD format.

The mother form according to FIG. 4 is thus formed for each message. The header and data fields and their parameters can be seen in each form in a form which is easy to read and in plain language. The work station is able to make the linkage from a field on the mother form to the right spot in the raw data flow.

After the mother form has been formatted by the supplier of the telephone exchange, e.g. in the telephone exchange shown in FIG. 3, a copy of it will be transferred from the computer to a diskette. The mother form on the diskette is of a read-only type, so it can not be edited in any way. This means that when the exchange supplier has made the mother form and delivered it to the operator, the latter can not change the mother form. Of course, the supplier may make changes.

Thereafter the diskette is taken to the operator's billing centre or to the network management unit. and it is pushed into a general purpose computer, e.g. into computer 6 in FIG. 3. This computer has a windows based program, which creates a user form and the operation of which will be described in the following.

The user form shown in FIG. 5 has a lay-out which is quite similar to that of the mother form. Thus the file name of its top part contains the same data as in the mother form: the first digits 4543 of the series of numbers give the message number, to which the mother form and thus also the user form are related, the following three digits 003 indicate the message type. The letter P states that the form is a passive form. The significance of this will be explained later. The full stop is followed by three digits stating the version of the user form: the user may at any time create a new form, whereby it will have a new version number.

The form header on the following line contains the fields Format Number, Output Mode and Output device, which states that the CDR to be formatted with the form will be saved on a diskette.

These are followed by data relating to the first header line of the CDR to be formatted, Header field name, Type and Length. The proper fields contained in the! CDR come under Data field Name, Type, Length, Position and Format.

The said form headers and header lines come automatically according to the mother form into the user's computer display when he has started the program and has pushed the diskette into the read station. The field names are exactly the same as in the mother form and they can neither be changed nor must they be changed.

Figure 6:
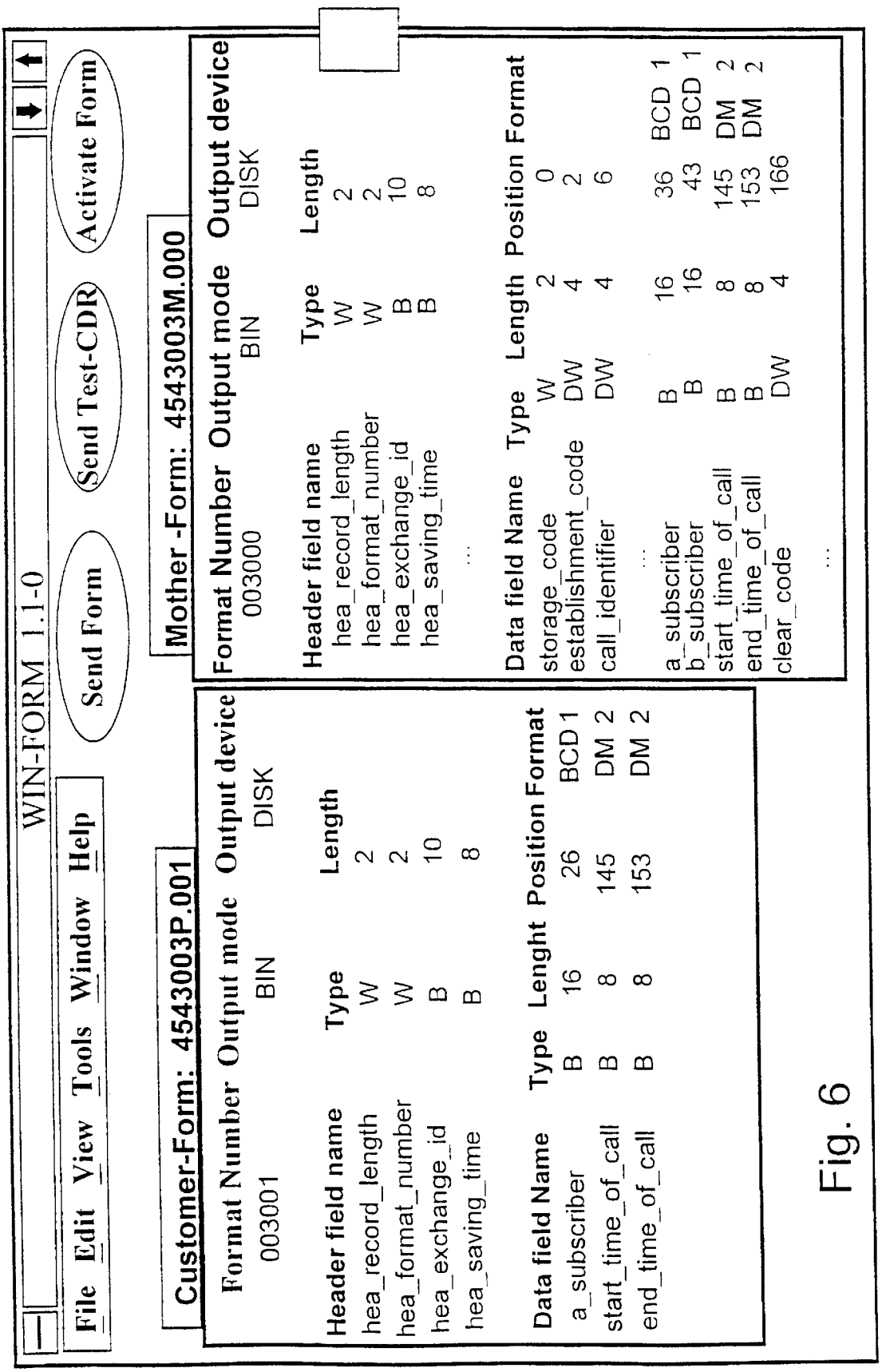
FIG. 6 illustrates formatting of a user form.

FIG. 6 shows a view seen by the user after starting the program and after he has pushed the diskette into the work station. The view is a typical windows view with its basic keys. On the right hand the diskette has provided a mother form according to FIG. 4, which contains all possible message fields. On the left hand is a user form blank according to FIG. 5. The user picks up the fields he desires from the mother form simply by choosing them with the mouse and by dragging them into the user form and dropping them under the respective field header. Thus, in the case shown in the figure, the user has chosen from the header fields of the mother form the first four fields, but from the data fields only Subscriber A's field and those fields which give the start time of the call and the end time of the call respectively.

It is possible for the user in some cases also to change parameters of the fields. Thus e.g. the length of the Subscriber A field, which is 16 characters in the figure, may be shortened to 8 characters by replacing the number 16 with the number 8.

When the user has made the form he desires, it is saved and transferred in one way or the other to computer 5 in the billing centre and to exchange 1, FIG. 3. Field "customer form" in the top part of the form contains status code P, which means a passive form.

Saving may be done on a diskette, which is taken to the OMU unit (Operation & Maintenance Unit) of the telephone exchange and to the billing centre.

Saving may also be done in such a way that the user form is transferred as a file transfer or the diskette is taken to network management 4, FIG. 3. When he desires, the user of this will press e.g. the send key on the computer 6, whereby, network management will transfer the user form to the telephone exchange and to the billing centre.

Testing of the user form can now be performed. When the form has been transferred to the telephone exchange and to the billing centre, testing is performed without interfering with any formatting and sending of CDRs which are going on at the time. Testing is carried out in such a way that network management gives the name of the passive form to be tested and the exchange is notified that this form is being tested. The MML function then feeds such a test data flow to the telephone exchange which has the structure of a proper message. The test data may be a binary file corresponding to binary data of the correct message and which may be edited. From the incoming test data flow the formatting process picks up the data corresponding to fields specified in the form and formats CDRs according to the form. The formatted test CDRs are sent among CDRs proper to the billing centre.

The test CDRs are data queues of a certain length which are sent to the billing centre as they are produced. Since it has at its disposal exactly the same user form as the one with which desired data was extracted from the test data flow during the formatting process in the exchange, it is able by using the same form as interpreter easily to format field names and to append to these exactly correct data from the data flow. As a result, the billing centre obtains in the display the field names given in the form and the correct records under the names.

For the billing centre to be able to distinguish test CDRs from proper CDRs, the arrangement may be such that the test form produces some separator in the CDR, whereby the billing centre will not take the test CDR to post processing proper. It is of course possible to take test CDRs to post processing proper and to format telephone bills of them. This is advantageous so that the correct function of the test form can be ensured until the end. The separator marks in the test CDRs guarantee that formatted telephone bills will not be sent any further.

Figure 1:
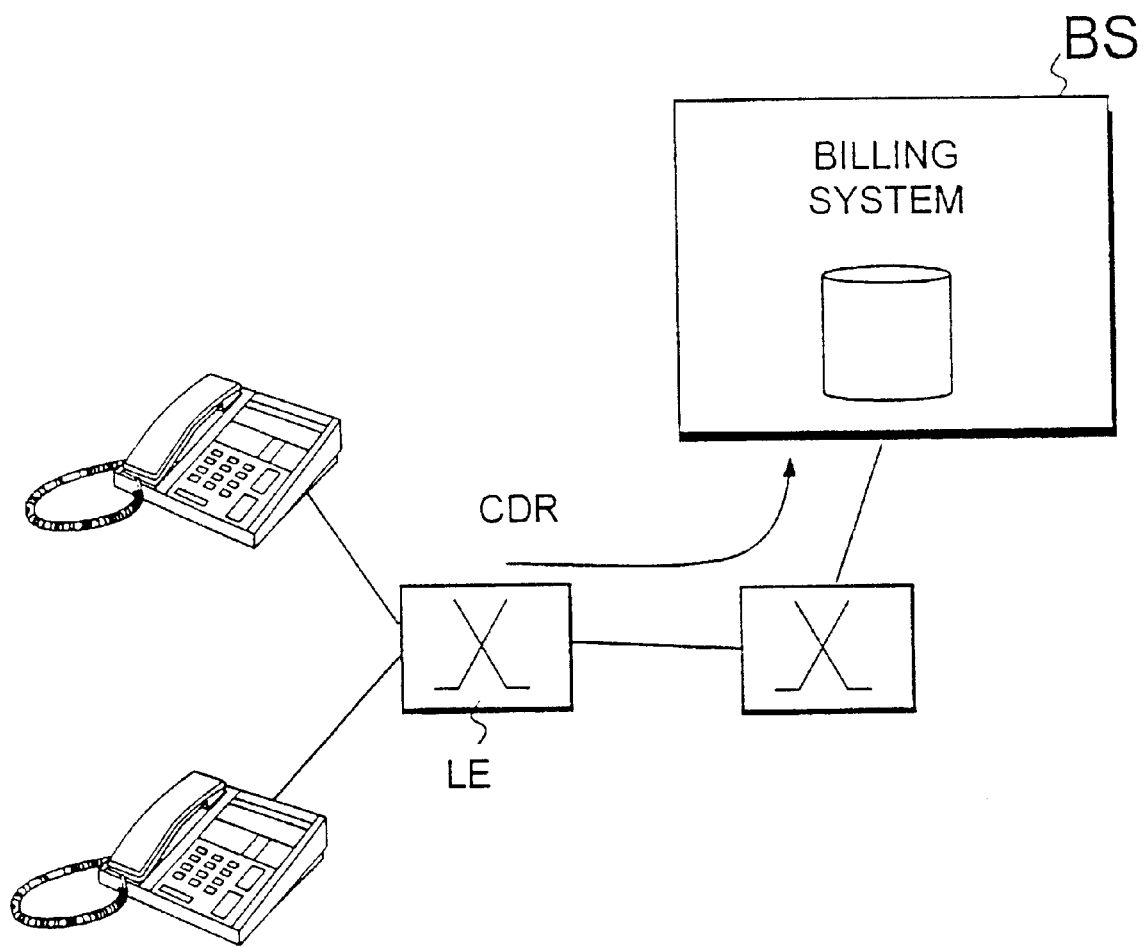
FIG. 1 shows the billing principle.
Figure 2:
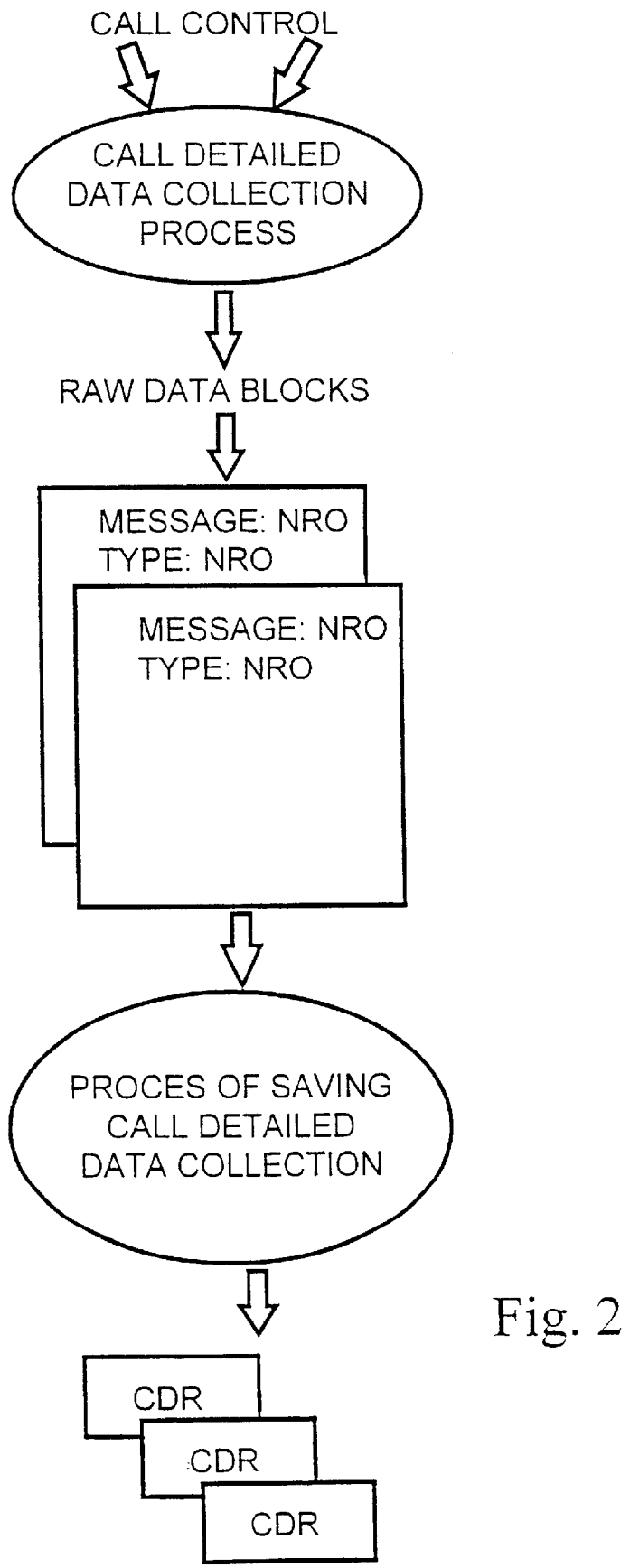
FIG. 2 shows formatting of CDRs.

When testing has shown that all is working without fault, the form which is in a passive state (mark P) may be activated by changing the mark into A (Active). Activation is done e.g. by network management by using the windows program to bring up the passive form and by pressing the "activate form" key, FIG. 6. The change from passive into active is done in the telephone exchange. Thereupon the call detailed data collection saving process, FIG. 2, immediately puts the now active user form into use and begins formatting CDRs, wherein there are records indicated in fields of the form. The formatted CDRs are sent by the telephone exchange to the billing centre, which using the same form can extract the correct records from the data flow.

Some checks may be made in the telephone exchange as regards the formatted CDRs. Firstly, an initial check can be made by ensuring that the call end time minus the call start time picked up from records is equal to the length of the call. Secondly, a CRC check or some other known transfer protection may be added to the data to be sent on the transfer path from the telephone exchange to the billing centre. Thirdly, a separator mark of sufficient length may be added to forms so that formatted CDRs can be clearly distinguished from each other.

Figure 7:
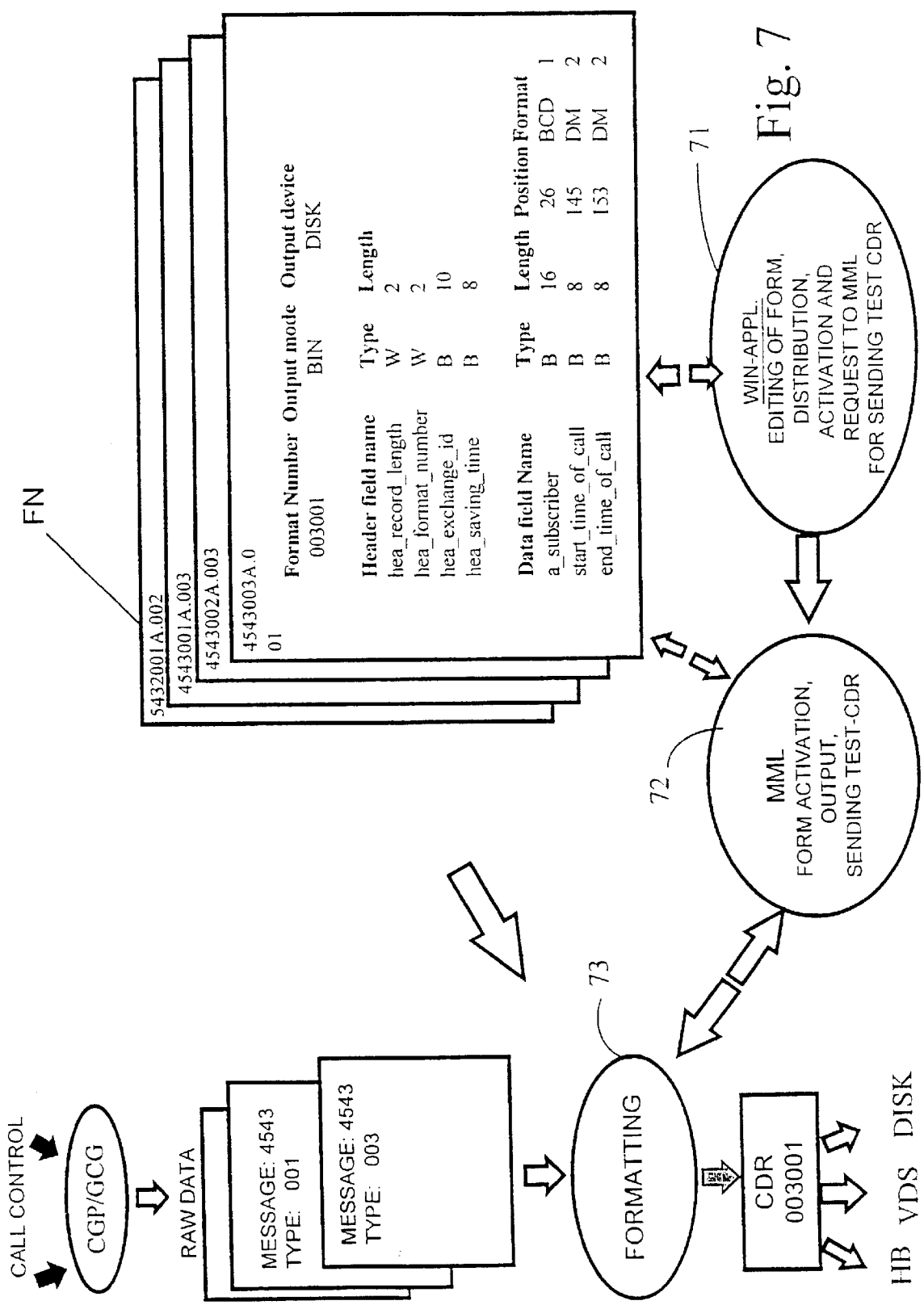
FIG. 7 shows use of the form in formatting of CDRs.

FIG. 7 shows the use of user forms in a telephone exchange. The user forms in a passive state are saved in the OMU. In function 71 the user makes the form or forms he desires, which are then taken on a diskette to the telephone exchange or to the network management common to all exchanges and to the billing centre. The user requests that an MML command be given for performance of the test.

When the operator wishes to introduce a certain form to get the CDRs he desires, he presses the Activate Form key in the program, which gives the MML function a request for activation of the form. The command picks up the desired form from the directory and makes it active, function 72. At the same tine, the billing centre has introduced the same form. The formatting process 73 produces desired CDRs, which are sent to the billing centre.

The use of forms according to the invention allows very flexible editing of CDRs. When e.g. it is desired to add a field to the CDR, say, an encryption code, an old form is taken as a basis and the encryption code is added to it. The Windows program generates a new version of the form, which will have a new format number. The new form is sent to the telephone exchange and to post processing. During this time, the CDRs are still filled with the old form. After the test CDR has been sent and the functioning of post processing has been ensured in the billing centre, the new form is activated at the same time as the old form is made passive. The exchange will immediately produce CDRs, wherein the encryption code is present and which carry the new format number. The format is thus exchanged on the move.

The use of forms is also very convenient when raising the exchange standard, which means changing of the exchange software. Hereby generated and frozen mother forms corresponding to the new standard and having as their file name e.g. 4543000M.100 are taken to a new directory of the computer. The version number has been changed here into a new hundred number and the first number is 100. The now active user forms are then copied into the same directory and a conversion program is run, which will convert old user forms to correspond with the new message, where fields have new positions. Field names are used as search keys. The version is changed in the conversion, e.g. 4534003.008→4543003P.101 and like-wise the format number changes e.g. 003008→003101. New passive forms are then sent to the telephone exchange on the so-called trial side, where testing of the new software is performed without interfering with the old running software, and to post processing. Next, new test CDRs are sent from the trial side, if possible, and the functioning of post processing is ensured. Upon completion of testing, the new forms are activated from the trial side and switch-over is done, whereupon the new forms are in use.

If there is no separate network management and billing centre in the network, the user form is made with the aid of a separate general purpose computer, which is indicated by reference number 7 in FIG. 3.

The mechanism of the invention has the advantages that change of format can be done dynamically on the move and post processing is immediately synchronised into the change. Several different CDRs can be made for different requirements, whereby it is possible to format short CDRs. A correct functioning is ensured by sending test CDRs. The form contains all the data relating to formatting, transferring and interpretation of CDRs. CDR formats are managed in a centralised manner and the same graphic user interface is used both by the exchange supplier and by the operator.

What is claimed is:

1. A method of generating billing records in a telephone exchange, the method comprising:
   receiving call records, having messages of different types containing raw data for a formatting process,
   opening, using a toolkit, a message structure containing raw data as field headers and field parameter data,
   using the message structure to generate a mother form, and wherein the mother form is a file which contains all field headers and field parameter data of the message in plain language,
   displaying the mother form and a blank user form in a graphical user interface,
   formatting a user form, which is a file, by choosing in the graphical user interface in a desired order desired field headers and field header parameter data from the mother form to the user form,
   generating Call Detail Records (CDR) in the formatting process by separating data of fields specified in the user form from the incoming message, and
   sending the Call Detail Records (CDR) to a billing center.

2. The method as defined in claim 1, wherein for each message a separate mother form is formatted.

3. The method as defined in claim 1, wherein a message number and a message type identifier and a mother form's version number are placed in a file name of the mother form.

4. The method as defined in claim 3, wherein a file name of the user form is generated in accordance with the file name of the mother form, so that the message number and message type identifier are transferred to the user form, and the user form's version number is located in the file name of the user form.

5. The method as defined in claim 3, wherein a status data field is placed in a header field of the user form which states whether the user form is passive (P) or active (A), wherein, call detailed records (CDR) are formatted according to fields specified in this user form only when the form is active.

6. The method as defined in claim 5, wherein testing of the user form occurs before the form's activation, so that test call detailed records are formatted with aid from a test data flow, placing a separator mark in the formatted test call detailed records before formatted test call detailed records are sent to the billing center, and extracting, by the billing center, the test call detailed records from an incoming data flow using the user form.

7. The method as defined in claim 5, wherein in response to activation of the passive user form, the formatting process of the telephone exchange immediately begins formatting call detailed records (CDR) by extracting data of fields specified in the user form from incoming messages.

8. The method as defined in claim 1, wherein the mother form is formatted by a supplier of a telephone exchange while an operator formats the user form.

9. The method as defined in claim 1, wherein a supplier of the telephone exchange formats both the mother form and the user form.

10. The method as defined in claim 1, wherein the billing centre uses the user form for interpreting data of received call detailed records.

11. The method as defined in claim 10, wherein in response to activation of a passive user form, the billing centre immediately begins using the user form for processing received call detailed records.

12. Telecommunication system comprising:

several telephone exchanges, wherein call records in various types of messages containing raw data arrive in a formatting process which generates Call Detail Records (CDR), and which transmits the Call Detail Records, a billing centre which receives the Call Detail Records (CDR) and performs post processing of these to format telephone bills, network management for controlling the operation of telephone exchanges, wherein at least one mother form, which is a file, contains all field headers and field parameter data of the message, at least one user form, which is a file, wherein desired field headers and their parameter data are located in a desired order from the mother form, a graphical user interface means for displaying a mother form and a blank user form, and an activation unit for activating the user form in the telephone exchange so that the formatting process will generate Call Detail Records (CDR) by separating data of fields specified in the user form from the incoming message.

13. The telecommunication system as defined in claim 12, wherein the user form is also placed in the billing centre and that when the user form is active the billing centre uses this user form for extracting data of fields specified therein from call detailed records (CDR).

14. The telecommunication system as defined in claim 12, wherein in response to an operator's request for activation the network management performs activation of the user form of the telephone exchange.

15. The telecommunication system as defined in claim 12, wherein the mother form is made by a supplier of the telephone exchange as a file delivered to an operator as a diskette recording and that the user form is made by the operator, based on the mother form, as a file delivered to the supplier of the telephone exchange and to the billing centre as a diskette recording or delivered through the network.

16. The telecommunication system as defined in claim 15, wherein both the mother form and the user form are ASCII files.

* * * * *